(12) United States Patent
Allison (10) Patent No.: US 8,783,656 B2
(45) Date of Patent: Jul. 22, 2014

(54) VALVE ASSEMBLY

(75) Inventor: Ian Allison, Sylvan Lake (CA)

(73) Assignee: Kings Energy Services Ltd., Red Deer County, Alberta (CA)

( * ) Notice: Subject to any disclaimer, the term of this patent is extended or adjusted under 35 U.S.C. 154(b) by 128 days.

(21) Appl. No.: 13/264,161

(22) PCT Filed: Apr. 12, 2010

(86) PCT No.: PCT/CA2010/000536
§ 371 (c)(1),
(2), (4) Date: Oct. 13, 2011

(87) PCT Pub. No.: WO2010/118510
PCT Pub. Date: Oct. 21, 2010

(65) Prior Publication Data
US 2012/0037821 A1 Feb. 16, 2012

(30) Foreign Application Priority Data
Apr. 15, 2009 (CA) .................................. 2663374

(51) Int. Cl.
*F16K 5/00* (2006.01)
*F16K 5/06* (2006.01)
*F16K 31/00* (2006.01)
*F16K 43/00* (2006.01)
*F16K 51/00* (2006.01)
*F16L 55/18* (2006.01)

(52) U.S. Cl.
USPC ................. 251/315.12; 251/292; 251/315.13; 251/316; 251/317; 137/315.21

(58) Field of Classification Search
CPC ... F61K 5/0636; F61K 5/0689; F61K 27/067; F61K 5/0605; F61K 35/06; F61K 43/00; F61K 5/0626; F61K 5/201; F61K 5/0642; F61K 5/20
USPC ................. 137/315.18–315.22; 251/315.01, 251/315.11, 315.12, 291, 292, 315.1, 251/315.09, 315.15, 315.16, 315.17, 251/315.25, 315.26, 316, 317
See application file for complete search history.

(56) References Cited

U.S. PATENT DOCUMENTS

| | | | | |
|---|---|---|---|---|
| 2,619,986 A | * | 12/1952 | Goepfrich | ................ 251/129.17 |
| 3,096,966 A | * | 7/1963 | McFarland, Jr. | .............. 251/214 |
| 3,132,836 A | * | 5/1964 | Dickerson et al. | ............ 251/171 |
| 3,150,681 A | * | 9/1964 | Hansen et al. | .............. 137/454.2 |
| 3,154,094 A | * | 10/1964 | Bredtschneider et al. | ........................ 137/315.21 |

(Continued)

FOREIGN PATENT DOCUMENTS

GB 1416327 12/1975

*Primary Examiner* — John K Fristoe, Jr.
*Assistant Examiner* — Hailey K Do
(74) *Attorney, Agent, or Firm* — Davis & Bujold, PLLC; Michael J. Bujold (57) ABSTRACT

A valve assembly includes a valve body and a bonnet. The valve body has a cylindrical access channel with adjoining at least one radial keyway. At least one coupling cavity adjoins and is out of register with the at least one radial keyway. The bonnet has a cylindrical body with at least one radially extending lug. The at least one lug is configured and sized to be accepted by the at least one radial keyway and to be housed within the at least one coupling cavity when the cylindrical body is twisted so that the at least one lug is out of register with the at least one radial keyway.

10 Claims, 6 Drawing Sheets

(56) References Cited

U.S. PATENT DOCUMENTS

| | | | |
|---|---|---|---|
| 4,000,952 A * | 1/1977 | Bryan et al. | 403/271 |
| 4,004,776 A | 1/1977 | Stender | |
| 4,047,697 A * | 9/1977 | McGee | 251/328 |
| 4,184,507 A | 1/1980 | Richards | |
| 4,231,440 A | 11/1980 | Erwin | |
| 4,286,614 A * | 9/1981 | Kacal et al. | 137/72 |
| 4,326,557 A * | 4/1982 | Behle | 137/316 |
| 4,388,945 A * | 6/1983 | Johnson et al. | 137/315.21 |
| 4,632,142 A * | 12/1986 | Shames et al. | 137/437 |
| 4,940,210 A | 7/1990 | Gilmore, II | |
| 5,236,006 A | 8/1993 | Platusich et al. | |
| 5,361,801 A * | 11/1994 | Kerpan et al. | 137/547 |
| 5,803,110 A * | 9/1998 | Segal | 137/68.14 |
| 6,286,810 B1 | 9/2001 | Dole et al. | |
| 6,446,666 B1 * | 9/2002 | Wadsworth et al. | 137/556 |

\* cited by examiner

VALVE ASSEMBLY

FIELD

The present technology relates to a valve assembly with a valve body and bonnet that affords ready access to a ball member, ball seat and associated seals while the valve is still in line.

BACKGROUND

Repair of ball members, seals and ball seats requires access to these components through an access in the valve body. This access is closed with a bonnet. Current designs include bolting the bonnet to the valve body or threading the bonnet to the valve body. With these designs, the cavity of the valve body is necessarily sized such that removal of the ball member is difficult and removal therefore often requires the use of special tools and can result in damage to the valve seats and associated seals. Further, threaded bonnets frequently are difficult to open and are often damaged during unthreading. Further more the valve body member must be removed from the line to facilitate proper repairs.

SUMMARY

There is provided a valve assembly which includes a valve body and a bonnet. The valve body has an exterior surface and an interior surface. The interior surface defines at least two ports with a ball receiving cavity therebetween. A cylindrical access channel extends from the exterior surface to the ball receiving cavity. The access channel has at least one adjoining radial keyway. The at least one radial keyway extends from the exterior surface toward the ball receiving cavity. At least one coupling cavity adjoins and is out of register with the at least one radial keyway. The bonnet has a cylindrical body with an exterior surface and an interior surface. The cylindrical body is sized to closely fit within the access channel of the valve body. The interior surface defines a stem channel in which a stem of a ball member is positioned. At least one lug extends radially from the exterior surface of the cylindrical body. The lug is configured and sized to be accepted by the at least one radial keyway and to be housed within the at least one coupling cavity when the cylindrical body is twisted so that the at least one lug is out of register with the at least one radial keyway.

The design of the bonnet and valve body of the valve assembly, allows for easy access to the ball member, thereby reducing damage to the seats and seat support plates during repair, in addition to simplifying removal of the ball member.

As a safety feature, the valve assembly may include safety lock apertures in both the valve body and the bonnet. Safety lock pins are inserted and concurrently engage both the valve body and the bonnet, so there cannot be relative rotation.

In order to facilitate injection of sealant, there may be provided one or more sealant ports in the valve body with a sealant fitting. It is preferred that the sealant fitting have a nipple or other provision for injecting sealant. It is preferred that the ball seats and ball seat support plates have peripheral sealant transfer grooves to provide a path for sealant.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
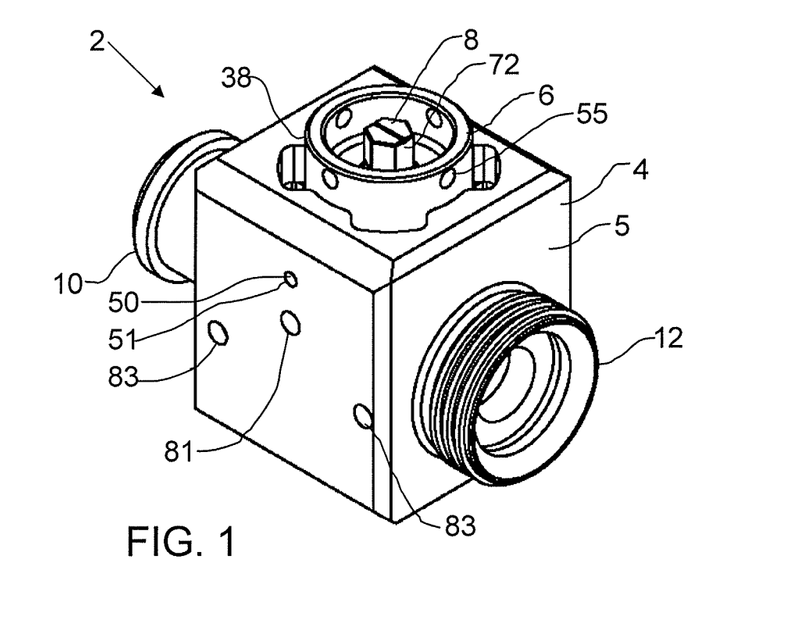
FIG. 1 is a perspective view of a valve body and bonnet combination.
Figure 2:
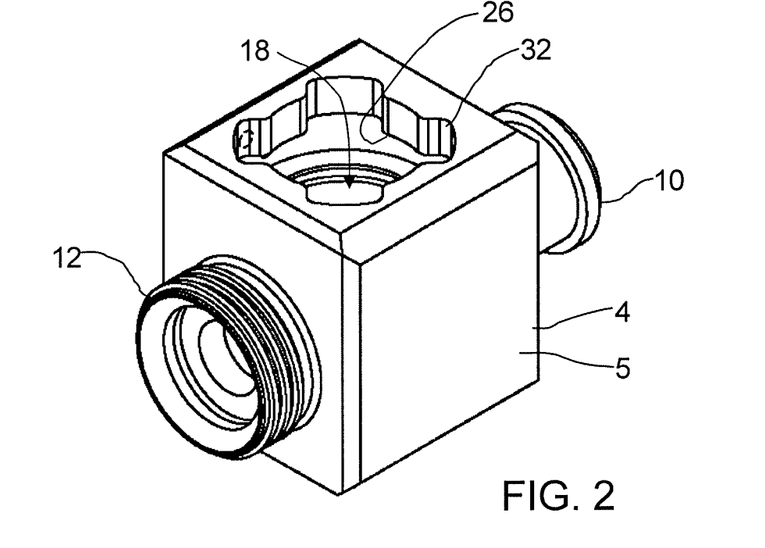
FIG. 2 is a perspective view of the valve body illustrated in FIG. 1.
Figure 6:
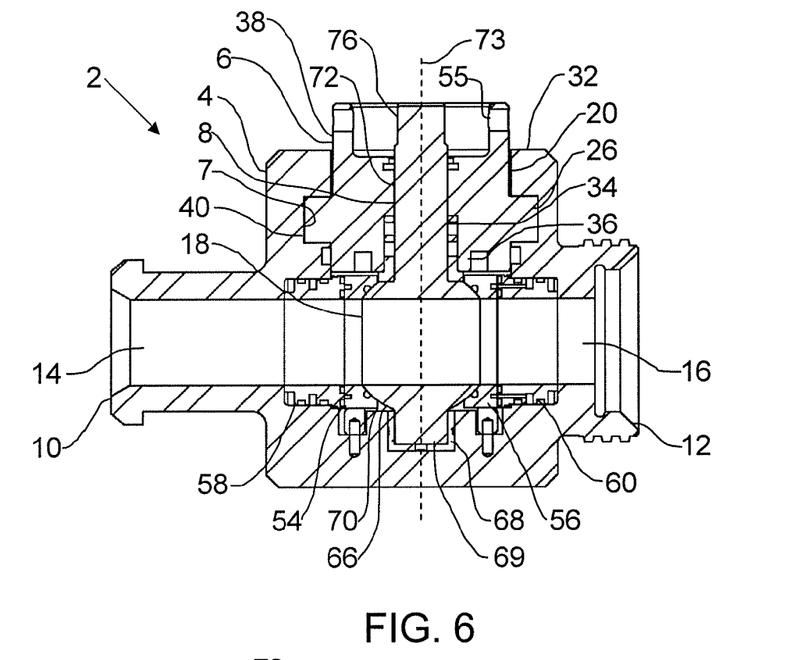
FIG. 6 is a side elevation view in section taken along section lines C-C of FIG. 5.

Referring to FIG. 1, a valve assembly is generally referred to as 2. As shown, valve assembly 2 is a breach lock valve assembly. The main components of valve assembly 2 are a valve body 4 illustrated in FIG. 2, a bonnet 6 illustrated in FIG. 3 and a ball member 8 illustrated in FIG. 4. As shown in FIG. 2, the valve body 4 has an exterior surface 5 with a first port 10, and an opposing second port 12. Ports 10 and 12 are referred to as first port 10 and second port 12, as fluid can pass in either direction through them depending upon the nature of the installation. Referring to FIG. 6, a first channel 14 and a second channel 16 are in fluid communication with a ball receiving cavity 18 defined by interior surface 7 of valve body 4 and extend between cavity 18 to their respective ports. Extending at right angles to the channels 14, 16 and away from ball receiving cavity 18 (distally) is a cylindrical access channel 20. Access channel 20 is in communication with ball receiving cavity 18. Access channel 20 has adjoining radial keyways 32. Radial keyways 32 extend outwardly from access channel 20 for a depth that extends from exterior surface 5 of valve body 4 inwardly toward ball receiving cavity 18. Coupling cavities 26 are defined by interior surface 7 adjoining and out of register with radial keyways 32. There is at least one radial keyway 32 and coupling cavity 26, but preferably three or four.

Figures 3, 4:
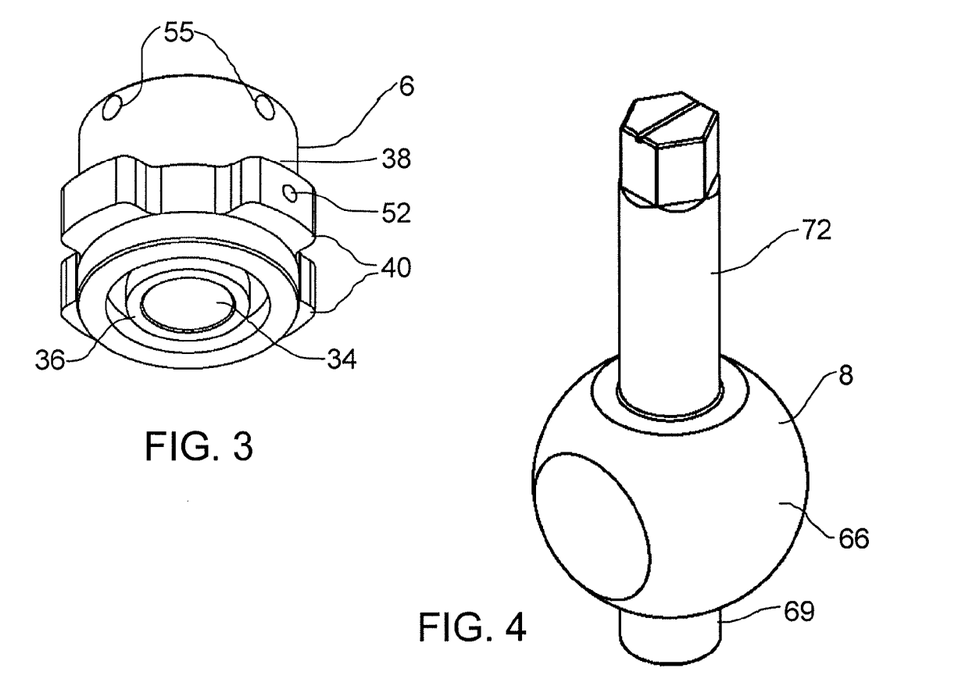
FIG. 3 is a perspective view of the bonnet illustrated in FIG. 1.
FIG. 4 is a perspective view of a ball member from the combination illustrated in FIG. 1.
Figure 5:
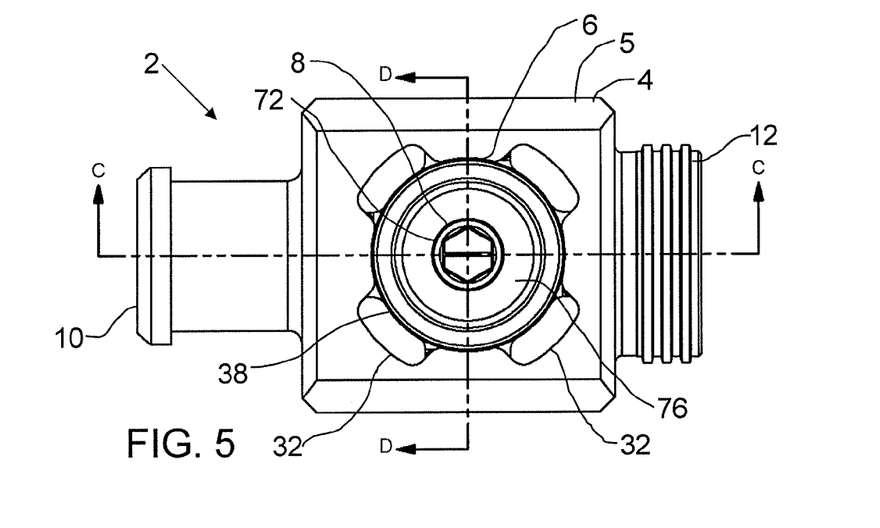
FIG. 5 is a top plan view of the combination illustrated in FIG. 1.
Figure 7:
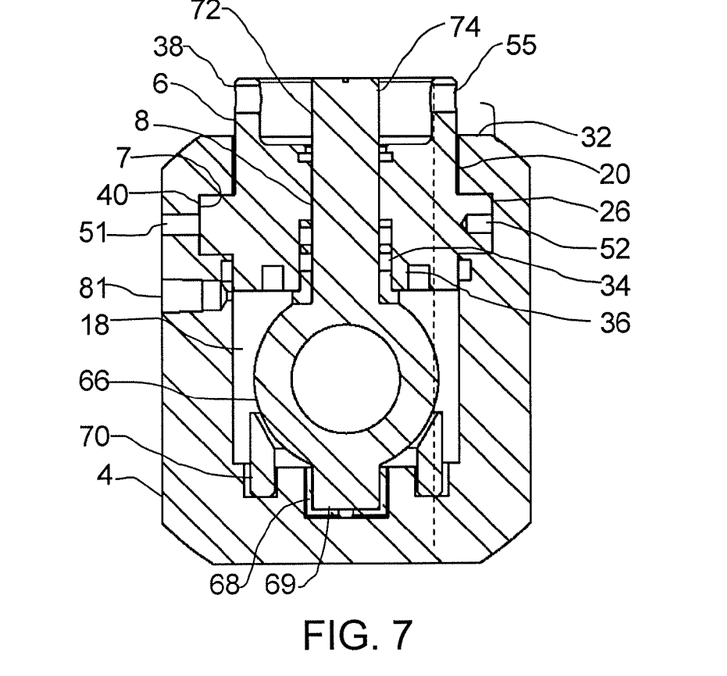
FIG. 7 is an end elevation view in section taken along section lines D-D of FIG. 5.

Referring to FIG. 3, bonnet 6 is generally cylindrical. It has a stem channel 34 defined by an inner collar 36. Referring to FIG. 5 through 7, stem 72 of ball member 8 is positioned in stem channel 34 during assembly. Referring to FIG. 3, bonnet 6 has an exterior surface 38. Exterior surface 38 of bonnet 6 has at least one lug 40, and preferably three or four lugs, disposed therearound corresponding with radial keyways 32 of valve body 4, and sized to be accepted by radial keyways 32, and to be housed within coupling cavities 26 when bonnet 6 is rotated so that lugs 40 are out of register with radial keyways 32, in a manner that releasably seals bonnet 6 to valve body 4. Safety lock pins 50 are insertable into safety lock apertures 51 and 52 provided on valve body 4 and bonnet 6, respectively, for releasably locking valve body 4 to bonnet 6. Bonnet removal holes 55 are disposed distally around bonnet 6, such that a tool can be inserted to engage and facilitate removal of bonnet 6.

Figure 8:
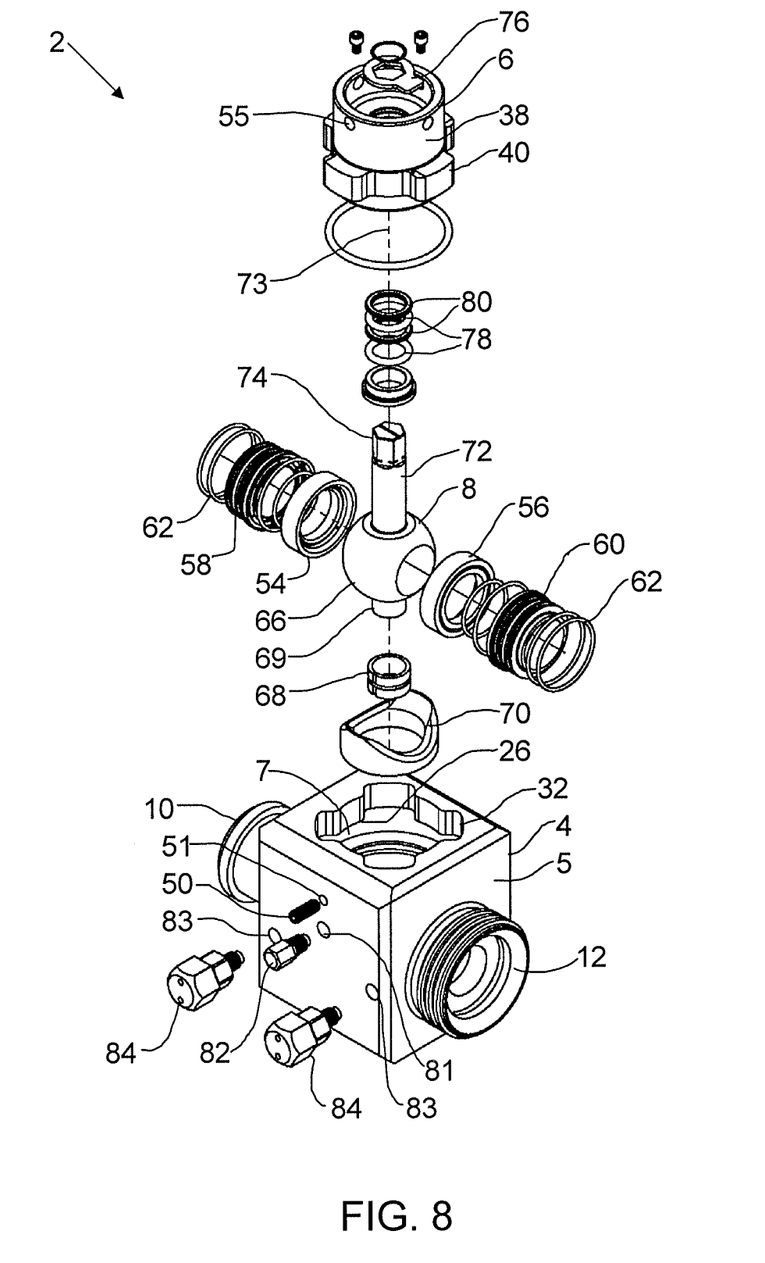
FIG. 8 is an exploded perspective view of the combination of FIG. 1.
Figure 9:
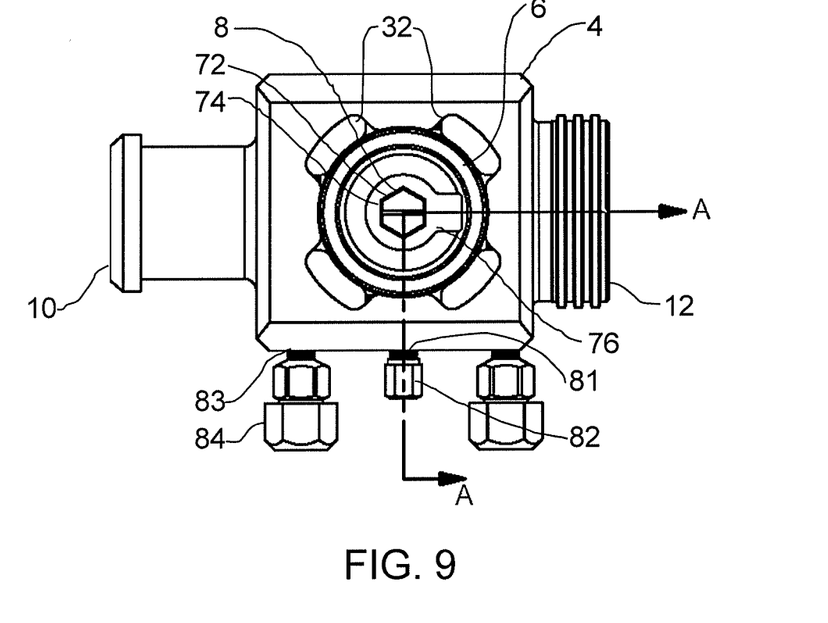
FIG. 9 is a top plan view of the combination of FIG. 1.
Figure 10:
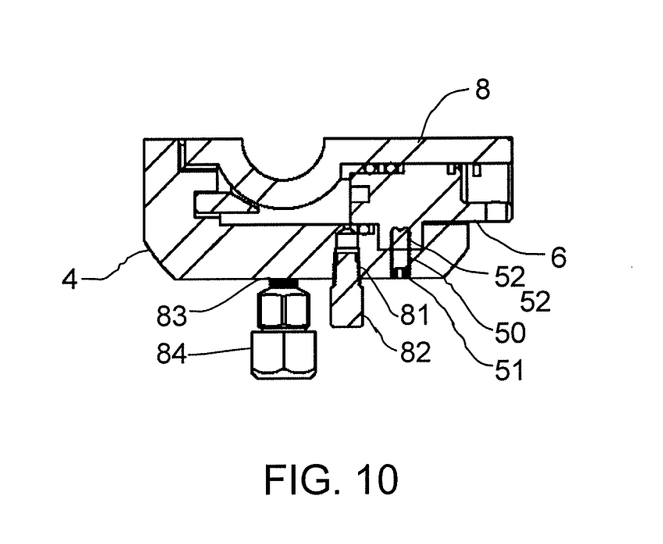
FIG. 10 is a detailed section view taken along section lines A-A of FIG. 9.

Referring to FIG. 8, there is illustrated an exploded view which exposes all internal components. A first seat 54 and a second seat 56 are proximal to first port 10 and second port 12, respectively, and are in sealing engagement with an first seat support plate 58 and a second seat support plate 60, respectively, by means of O-rings 62, or other suitable seals. Similarly, the seat supports plates 58, 60 are circumferentially engaged with valve body 4, by means of O-rings 62 or other suitable seals. The seats are configured to accept ball 66 of ball member 8. The ball and seat assemblies are each removable from access channel 20 as single units. Ball 66 is seated on a trunion bushing 68, sized to accept ball trunion 69, and a seat anti-rotation ring 70 is provided, again sized to accept ball 66. Seat anti-rotation ring 70 allows ball member 8 to rotate about its axis 73 while the seats 54, 56 remain stationary. A stem 72 extends from ball 66 to facilitate rotation of ball 66. Stem 72 terminates in a matable end 74, such as a hexagonal end, for accepting a valve stop plate 76. A series of washers 78 and O-rings 80, in addition to a guide bushing 64, ensures that ball member 8 can rotate about its axis 73 while remaining sealed from the ambient environment. Referring to FIGS. 9 and 10, a vent fitting 82 closes a vent aperture 81, which extends through valve body 4 and into ball receiving cavity 18. Valve body 4 is further provided with sealant transfer ports 83 that extend through valve body 4 terminating adjacent the seat support plates 58, 60. The sealant ports 83 are threaded to accept sealant port fittings 84 or other suitable threaded members. Preferably, sealant port fittings 84 have nipples through which sealant can be injected.

Referring to FIGS. 6 and 7, when in use, the seats 54, 56 and seat support plates 58, 60 are sealed with respect to ball 66 by means of dynamic forces applied by the seats 54, 56 and seat support plates 58, 60 as a result of the line pressure. O-rings 62, shown in FIG. 8, assist in sealing the system. Mating of matable end 74 of the stem 72 with valve stop plate 76 of bonnet 6 (shown in FIG. 9), along with the positioning of ball trunion 69 within trunion bushing 68, reduces the potential for misalignment of ball 66 while permitting first seat 54 to float under the influence of the line pressure and transfer the dynamic sealing force from the seats 54, 56 to ball 66. As the line pressure increases, the sealing forces on ball 66 increase.

Figure 11:
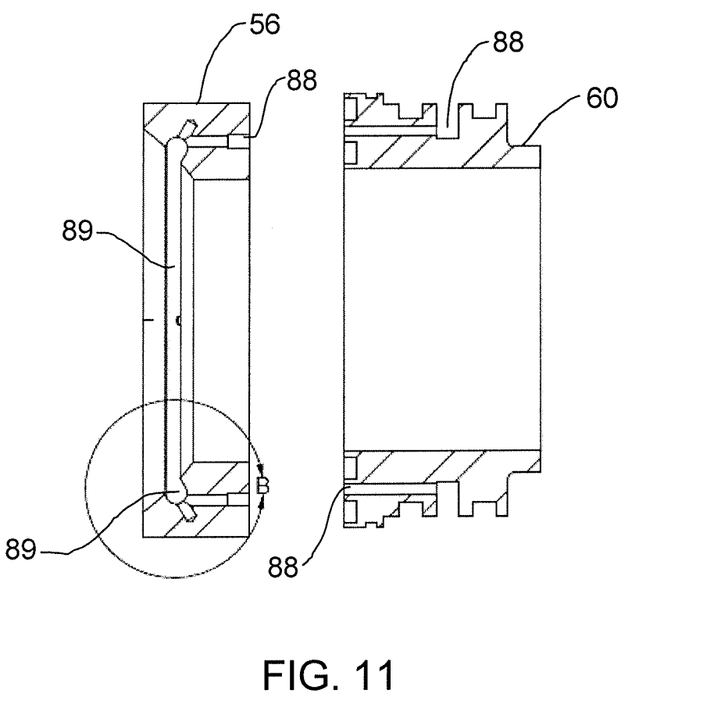
FIG. 11 is a detailed view of the right-hand seat and support plate seen in FIG. 8

Referring to FIGS. 8, 9 and 10, if the seats 54, 56 are damaged, valve integrity can be restored by injecting sealant through sealant port fittings 84 into sealant ports 83. It is to be noted that seat support plates 58 and 60 line up with sealant ports 83. Referring to FIG. 11, seat support plate 60 has sealant transfer grooves 88. In addition, there is a sealant transfer groove 89 on seat 56. Similar grooves are also found on seat 54 and seat support plate 58 (not shown). Sealant injected through sealant ports 83 is transferred along sealant transfer grooves 88 of support plates 58 and 60 to sealant transfer groove 89 which assists in transfer of the sealant around the seats 54, 56. This provides an emergency seal.

Referring to FIGS. 6 and 7, if replacement of parts is required, the design of valve body 4 and bonnet 6 allows for easy access to ball 66, seats 54, 56 and seat support plates 58, 60. Referring to FIG. 10, the user first bleeds the fluid or gas off by opening vent fitting 82 on vent aperture 81. Referring to FIGS. 6 and 7, the user then cycles ball 66 between the open and closed position to ensure that little or no pressure remains in the flow line. Referring to FIG. 10, the user then removes safety lock pins 50 from safety lock aperture 51 in valve body 4 and, referring to FIG. 3 from safety lock aperture 52 of bonnet 6. The user also removes any manual or automated accessories. Referring to FIG. 1, a pin-type tool (not shown) may then be inserted into bonnet removal holes 55. Bonnet 6 is disengaged from valve body 4 by turning bonnet 6 ¼turn. Referring to FIGS. 5 and 6, turning bonnet 6 takes lugs 40 out of coupling cavities 26 and into radial keyways 32. Referring to FIG. 8, removal of bonnet 6 exposes the valve components. Ball 66 and seats 56, 58 can be extracted as a unit. Once extracted, seat support plates 58, 60 can be extracted. The user then inspects the body 4 for erosion and damage, and installs new O-rings 62 on the seal support plates 58, 60. The seal support plates 58, 60 and the O-rings 62 are then inserted into valve body 4 and engaged. Referring to FIG. 6, the user then assembles the seats 54, 56 and ball 66 to provide a single insertable unit, which is then inserted between seat support plates 58, 60. Bonnet 6 is then replaced by aligning lugs 40 with radial keyways 32. Bonnet 6 then engaged with valve body 4, by rotating bonnet 6 until lugs are out of register with radial keyways 32 and engaged in coupling cavities 26. Referring to FIGS. 3, 8 and 11, bonnet 6 is then locked in position against accidental release through vibration or other means by inserting safety lock pins 50 back through safety lock aperture 51 of valve body 4 and into safety lock aperture 52 of bonnet 6. With safety lock pins concurrently engaging both valve body 4 and bonnet 6, there cannot be any relative rotation. The user then injects sealant through sealant fittings 84 into sealant ports 83. Sealant injected through sealant ports 83 is transferred along sealant transfer grooves 88 of support plates 58 and 60 to sealant transfer groove 89 which assists in transfer of the sealant around the seats 54, 56. The seat sealant groove may also function as a trash groove.

The foregoing is a description of an embodiment of the technology. As would be known to one skilled in the art, variations that do not alter the scope of the technology are contemplated. For example, there may be three or more ports with channels extending from the cavity that houses the closing member, the seats may be provided with an additional trash groove for collecting debris, and the closing member may be a plug or a ball. Further, the ports may be for example, but not limited to threaded, for threaded engagement with a pipe, or provided with a flange and apertures for bolted engagement with a pipe.

The invention claimed is:

1. A valve assembly, comprising:
   a valve body having an exterior surface and an interior surface, the interior surface defining:
   a first port and a second port with a ball receiving cavity therebetween;
   a cylindrical access channel extending from the exterior surface to the ball receiving cavity, the access channel comprising an alternating series of radial keyways and lug restraints, the lug restraints extending inward relative to the radial keyways and overhanging a coupling recess, the coupling recess comprising a continuous circumferential cavity in the inner surface of the cylindrical access channel that is accessible by radial keyways on either side of each lug restraint, the cylindrical access channel forming a continuous sidewall around and radially enclosing the radial keyways and the access channel;
   a ball positioned within the ball receiving cavity, and the ball having a stem; and
   a bonnet having a cylindrical body with an exterior surface and an interior surface, the cylindrical body being sized to closely fit within the access channel of the valve body, the interior surface defining a stem channel in which the stem of the ball is positioned, and comprising at least one lug that extends radially from the exterior surface of the cylindrical body, the at least one lug being configured and sized to be accepted by the radial keyways and to be housed within the coupling recess when the cylindrical body is twisted, in either direction, so that the at least one lug is out of register with the radial keyways and retained by the lug restraints.

2. The valve assembly of claim 1 wherein the at least one lug comprises four lugs that extend radially from the exterior surface of the cylindrical body.

3. The valve assembly of claim 1 further comprising at least one sealant port in the body sealed by a sealant port fitting.

4. The valve assembly of claim 1 further comprising a releasably sealable vent in the valve body, wherein the vent extends into the ball receiving cavity and is sealed by a vent fitting.

5. The valve assembly of claim 1 wherein the ball member is supported by seats supported by seat support plates, the seat support plates having peripheral sealant transfer grooves to transfer sealant to the seats and the seats having peripheral sealant transfer groove to transfer sealant around the seats.

6. The valve assembly of claim 1, further comprising a first seat assembly mounted at the first port and a second seat assembly at the second port, each of the first and second seat assemblies is sized to pass through and be installed from within the access channel.

7. The valve assembly of claim 6, wherein the first and the second seat assemblies comprise a pressure plate and a ball seat, and the pressure plate pushes the ball seat against the ball valve.

8. The valve assembly of claim 1 further comprising safety lock apertures in the valve body and bonnet and safety lock pins for releasably locking the bonnet to the body.

9. The valve assembly of claim 8, wherein the bonnet further comprises a ball stop plate for accepting a stem of a valve.

10. The valve assembly of claim 9, wherein the ball member has a trunnion that is positioned in a trunnion bushing within the valve body when the bonnet is engaged.

* * * * *